United States Patent [19]

Cleasby et al.

[11] Patent Number: 5,079,498
[45] Date of Patent: Jan. 7, 1992

[54] DIGITAL PULSE-WIDTH-MODULATION GENERATOR FOR CURRENT CONTROL

[75] Inventors: Kenneth G. Cleasby, Chichester; Jack T. D'Aeth, Portsmouth, both of England

[73] Assignee: Vickers Systems Limited, England

[21] Appl. No.: 675,495

[22] Filed: Mar. 26, 1991

[51] Int. Cl.⁵ .............................................. G05F 1/575
[52] U.S. Cl. .................................. 323/283; 323/284; 323/351
[58] Field of Search ............... 323/265, 267, 282, 283, 323/284, 349, 351

[56] References Cited

U.S. PATENT DOCUMENTS

| | | | |
|---|---|---|---|
| 4,425,612 | 1/1984 | Bahler et al. | 323/283 |
| 4,920,246 | 4/1990 | Aoki | 323/283 |
| 4,954,767 | 9/1990 | Buisson et al. | 323/351 |
| 4,974,141 | 11/1990 | Severinsky | 323/224 |

*Primary Examiner*—Jeffrey Sterrett
*Attorney, Agent, or Firm*—Barnes, Kisselle, Raisch, Choate, Whittemore & Hulbert

[57] ABSTRACT

The circuit provides digital control of current in an inductive load. A switching circuit generates a square wave PWM voltage drive to the load, and the current is sensed by sensor. This current is fed back as signal, which is compared with two zone boundary signals. The switching state is changed between ON and OFF accordingly.

The boundary signals are generated by adding and subtracting (by adder/subtractor) a half-zone-width signal (stored as digital data) in a zone width store with the signal. The zone position may be moved slightly up and down, under control of a counter driven by the ON-/OFF signal, to produce dither. The zone width may be selected in dependence on the input signal to reduce ripple at low signal, and to adjust the frequency. The switching circuitry may have multiple power supplies, and/or means for changing the connection of the load to the power supply to modify the rate of change of current and the direction of current in the load.

A separate analogue input may be summed with the feedback signal or the D/A output to modify the current magnitude or replace the input signal as the main input signal.

26 Claims, 5 Drawing Sheets

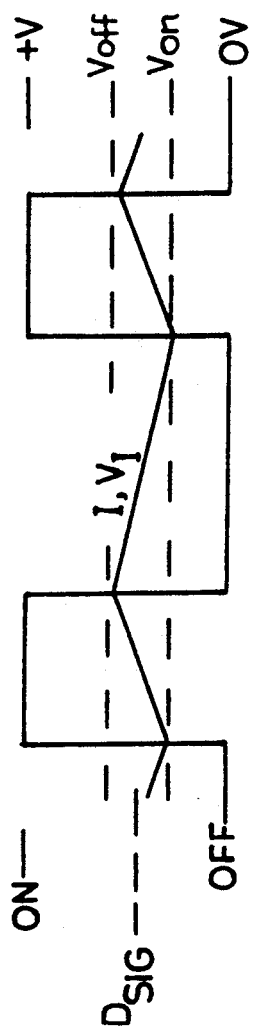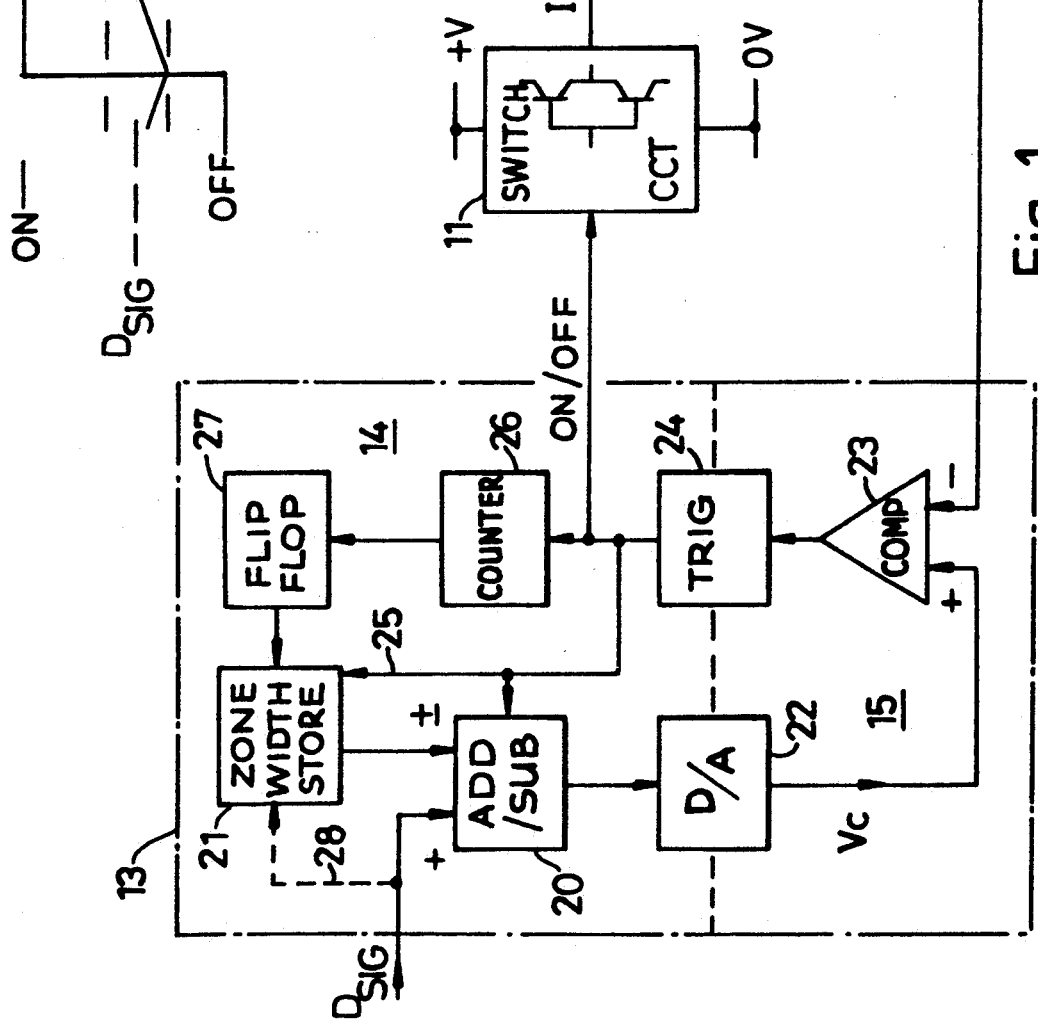

DIGITAL PULSE-WIDTH-MODULATION GENERATOR FOR CURRENT CONTROL

BACKGROUND OF THE INVENTION

The present invention relates to apparatus and method for the control of current in inductive loads and more particularly, to the use of a pulse-width-modulated (PWM) signal to effect accurate control over the current waveform.

The control of current through an inductive load is, for example, often necessary for the control of magnetic flux or heat produced.

An example of the need for accurate current control relates to proportional solenoid control and the need accurately to control the output force. In operation, the current in the solenoid must be continuously variable to provide a continuously variable force and smooth changes from one force level to another.

Such solenoids are used in hydraulic valves to provide continuously variable position control or pressure control. If no position or pressure feedback is used, the overall accuracy of the valve depends on the accuracy of control of the force produced by the proportional solenoid.

A continuously variable drive current can be produced by driving a suitable linear amplifier with the control signal. However, this involves a high energy dissipation in the amplifier. It has, therefore, become known to use a PWM (pulse width modulated) signal to drive the solenoid.

The energy dissipated by a PWM drive is substantially reduced because the power switching elements are either fully on or fully off. To control current with such a drive, the period of time during which the drive is on is adjusted relative to the period of time during which the drive is off in such a way that the average current is proportional to the control signal. The ratio between the on time and the off time is often referred to as the mark/space ratio.

In the case of an inductive load, the rate of change of current is limited. This means that the mark/space ratio must be adjusted to bring the current quickly to the desired amplitude then adjusted to give the desired average current.

This basic arrangement suffers from the disadvantage that the mean current to the solenoid depends not only on the amplitude of the control signal but also on the magnitude of the voltage of the power supply which is being switched by the modulator. This disadvantage is usually overcome by providing a solenoid current sensor the output of which is fed back to the modulator. This feedback signal allows the modulator to change the mark/space ratio to bring the current in the load to the correct level.

It has also been found that a fixed modulation ratio may result in poor response because of hysteresis effects in the solenoid. This can be overcome by superimposing a small "dither" signal on the control signal. This is usually achieved by providing a dither oscillator, which produces a small low-frequency signal which is added to the control signal before the control signal is fed to the modulator. It is preferable for the dither frequency to be synchronized with the modulator frequency but this may not readily be achieved if the PWM frequency changes significantly.

A further problem with the pulse modulator technique relates to modulators which operate at a fixed current ripple amplitude; this results in the current ripple amplitude being large in relation to the average current at low current levels.

The techniques discussed so far have all been essentially analogue in nature. In particular, it has been assumed that the control signal is an analogue signal. In many situations, however, the system in which the solenoid is included is largely digital in nature. The control signal may therefore be essentially digital, being generated by a microprocessor or some other similar digital circuitry. The problem therefore arises of driving a proportional solenoid from a digital control signal.

One possible solution is to arrange for the control source to generate a PWM signal directly, and feed that to a suitable drive circuit which feeds the solenoid. That arrangement suffers from the disadvantage of the simple pulse width modulator circuit mentioned above—that the average current to the solenoid varies with the power supply voltage.

Another possible solution is to generate the control signal as a multi-bit signal which is then decoded by a digital-to-analogue converter which drives an analogue circuit as discussed above. This allows current feedback but the problem of dither signal synchronisation and the problem of the current ripple amplitude being large relative to the current at low current levels remains. Further, the system requires the analogue modulator and dither oscillator, which are relatively costly, to be retained.

The object of the invention is to provide a digital PWM current controller in which the above problems are alleviated or overcome. In many situations the current controller may be used in a system which itself is digitally controlled and the current demand signal originates as a digital signal but the controller may also be advantageously employed if the demand signals are analogue.

SUMMARY OF THE INVENTION

The present invention is defined in the appended claims and provides circuitry for digital control of current in an inductive load, comprising control circuitry fed with a control signal, switching circuitry for driving the load with a pulse-width-modulated (PWM), load current sensing means, and a feedback path from the sensing means to the control circuitry, the control circuitry comprising means for storing zone width values in digital form, means for converting the zone width values to zone boundary signals, one on each side of the control signal, and means for comparing the feedback signal with the zone boundary signals and driving the switching circuitry with the resulting signal.

BRIEF DESCRIPTION OF THE DRAWINGS

Digital PWM current controllers embodying the invention will now be described, by way of example, with reference to the accompanying drawings, in which:

FIG. 1 is a block diagram of one embodiment;

FIG. 2 is a set of waveforms illustrating its operation, and

DESCRIPTION OF THE ILLUSTRATED EMBODIMENTS

Figure 3:
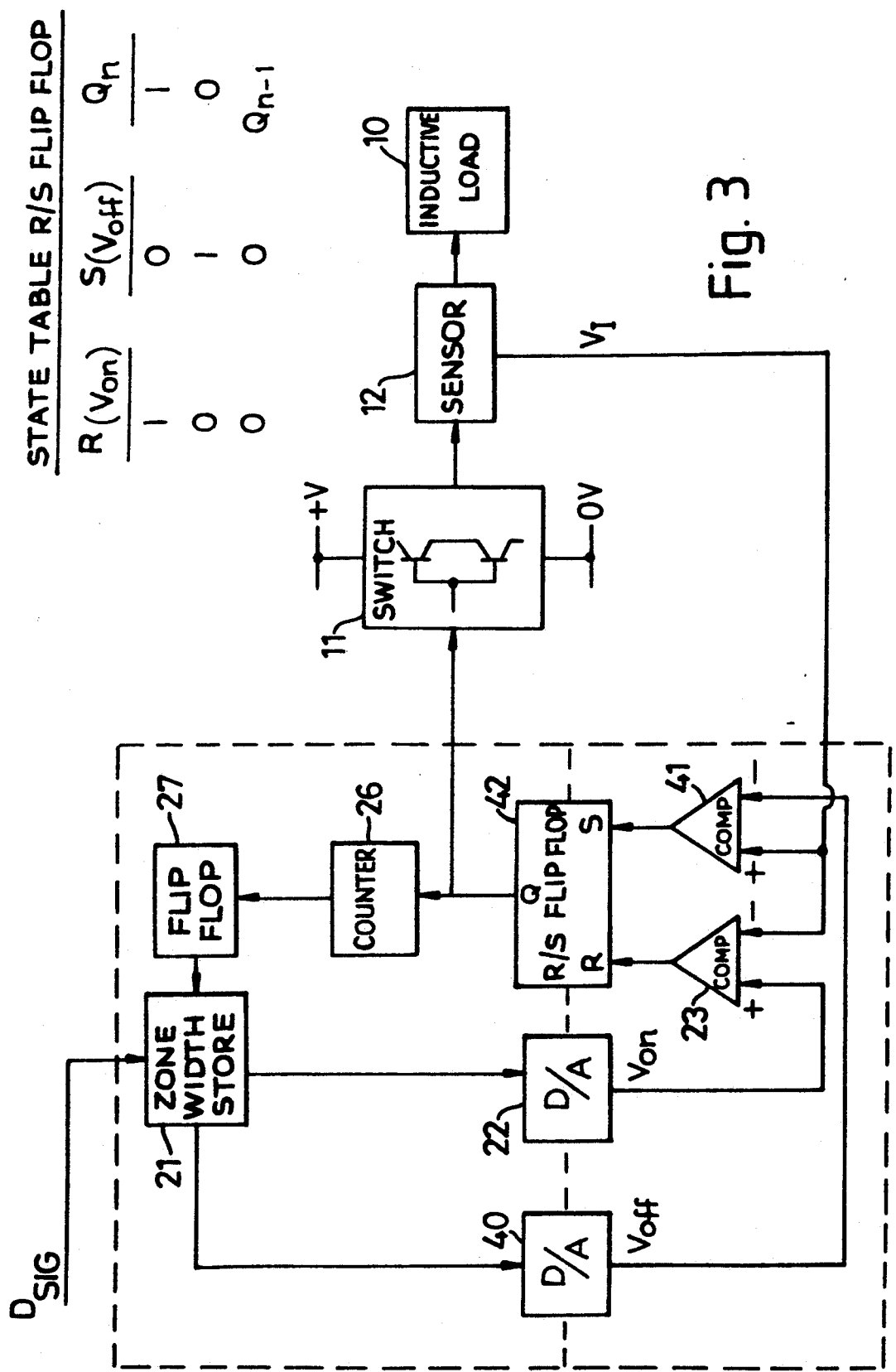
FIGS. 3, 4, 5 and 6 are respective block diagrams of four further embodiments of the invention.

Referring to FIG. 1, an inductive load 10 is driven by a switching circuit 11 via a current sensor 12. The switching circuit 11 is energized by a power supply on lines 0 V and +V, and consists essentially of switching means which connect either the 0 V line or the +V line to its output. This output is a current I which is fed to the load 10 through the current sensing device 12, which produces a voltage feedback signal $V_I$ which is proportional to the current I.

The switching circuit 11 is controlled by a control unit 13, which consists of a digital portion 14 and an analogue portion 15. The inputs to the unit 13 are a digital control signal $D_{SIG}$ representing the desired load current and the feedback signal $V_I$.

Referring to FIG. 2, the control unit 13 generates a square wave of variable mark/space ratio, which controls the switching circuit 11. This switches between the ON and OFF states to produce a corresponding square wave between the +V and 0 V levels respectively, which is applied to the load 10. The load 10 has a relatively high inductance, so the current through it does not follow the voltage square wave; instead, it rises and falls relatively slowly along exponential decay curves, typically as shown by the waveform I; the feedback signal $V_I$ has the same waveform. The average value of $V_I$ is the value of the control signal $D_{SIG}$, subject of course to possible fixed scale factors. (The control signal $D_{SIG}$ is, as noted above, a multi-bit digital signal; the line $D_{SIG}$ in FIG. 2 shows its magnitude.)

The present system works by generating two zone boundary voltage levels $V_{OFF}$ and $V_{ON}$ spaced approximately equally above and below $D_{SIG}$, comparing the feedback signal $V_I$ with them, and changing the state of the switching circuit 11 from ON to OFF when $V_I$ falls below $V_{ON}$ and from OFF to ON when $V_I$ rises above $V_{OFF}$. Thus when $V_I$ reaches either boundary of the zone defined by the signals $V_{ON}$ and $V_{OFF}$, the state of the switching circuit 11 is changed to keep $V_I$ in that zone.

Referring again to FIG. 1, the digital portion 14 of the control unit 13 includes an adder/subtractor unit 20 to which the control signal $D_{SIG}$ (in its digital form) is fed. A zone width store 21 has permanently stored therein a relatively small quantity, which is in fact half the width (in digital form) of the zone between the voltages $V_{ON}$ and $V_{OFF}$ within which the feedback signal $V_I$ is confined. The adder/subtractor 20 either adds this small value to the control signal or subtracts it from it, depending on the state of a binary control signal ON/OFF. The output of the adder/subtractor is therefore the control signal plus or minus the small stored value; this is in fact either $V_{ON}$ or $V_{OFF}$ in digital form.

The adder/subtractor 20 feeds a digital-to-analog converter 22 which produces an analogue signal, which is in fact either $V_{ON}$ or $V_{OFF}$. This is fed to a comparator 23, which is also fed with the feedback signal $V_I$. The comparator feeds a trigger circuit 24, which produces a signal ON/OFF, which is fed to the switching circuit 11 and also fed back to control whether the adder/subtractor 20 adds or subtracts.

It is evident that if the ON/OFF signal is ON (high), the adder/subtractor adds the half-zone-width signal to the control signal, so the output of the digital-to-analogue converter is $V_{OFF}$. As seen from FIG. 2, the feedback signal $V_I$ is less than $V_{OFF}$ and rising towards it during ON periods, so the output of the comparator 23 will be high and the trigger circuit 24 will continue to hold the signal ON/OFF at +V. When the feedback signal $V_I$ rises to equal $V_{OFF}$, the comparator output will go low, the trigger circuit output will change from ON to OFF, and the output of the switching circuit 11 will change. The function of the adder/subtractor will also change, so that it and the digital-to-analogue converter will produce the signal $V_{ON}$ (in digital and analogue forms, respectively). The circuit will therefore remain in the OFF state until the feedback signal $V_I$ falls to equal $V_{ON}$. The state of the circuit will then change back to the ON state, and so on.

It will be realized that correct operation of the controller depends on $V_I$ being proportional to the instantaneous current in the load, consequently there is no requirement for any filtering or smoothing of the feedback signal to derive an average value.

The circuit as described so far may be modified and enhanced in various ways.

Instead of using an adder/subtractor, a simple adder can be used, with the zone width store 21 being modified to store the half-zone-width value in both positive and negative form, and with the appropriate form being selected from it by feeding the ON/OFF signal to it as a select signal, as indicated at 25.

It will be realized that if the zone width ($V_{ON}-V_{OFF}$) is constant, then the frequency of the PWM signal will vary according to the rate of charge of current in the inductance. The rate of charge of current is usually dependent on the current amplitude. Also, the variation of the load current (the ripple amplitude) relative to its average will be large if its average is small. Both these effects can be compensated for by feeding the control signal $D_{SIG}$ over line 28 to the zone width store 21 and using say its magnitude to select a suitable zone width. For this, the zone width store 21 must be arranged to store a suitable number of slightly different half-zone-width values, the appropriate one being selected in accordance with the size of the control signal.

It will also be realized that the true average of the load current I may not be exactly midway between the two zone boundaries $V_{ON}$ and $V_{OFF}$. If desired, two slightly different values (one positive and one negative) for each zone width may be stored in the store 21 to compensate for this.

In some circumstances it may be desirable to arrange for the switching circuit 11 to reverse the connections of the load to the power supply or to use a switching circuit with additional actual or apparent power supplies (e.g. +2 V or −V as well as the +V and 0 V shown), and selecting the appropriate supply in dependence on say the rate of charge of current required. Such techniques can also be used to reduce energy dissipation in the switching circuit and/or the load or provide better control over the PWM frequency.

Dither may be incorporated by providing a counter 26 which divides down the frequency of the ON/OFF signal by a suitable factor and feeds a flip-flop 27 which in turn feeds a dither select input to the zone width store 21. For this, the zone width store 21 must be arranged to store two slightly different half-zone-width values, each in positive and negative form. For one phase of dither, the larger of the positive and the smaller of the negative values are selected; for the other dither phase, the smaller of the positive and the larger of the negative values are selected. This automatically generates a dither signal synchronized with the PWM drive signal.

This gives a square wave dither; a closer approximation to a sinusoidal or other waveform can of course be achieved if desired by providing more values in the store 21 and selecting them under control of appropriate ranges of output values from the counter 25.

Obviously, dither control of the store 21 can be combined with the other modifications and enhancements discussed above.

The system has been described in terms of discrete digital components (adder/subtractor, counter, etc). It will however be realized that the required functions can be achieved in a variety of ways, e.g. by using a suitably controlled microprocessor. For example, the half-zone-width values may be calculated from a nominal value which is adjusted in dependence on the dither select signal, the size of the input signal, etc, and the microprocessor may perform the adding and subtracting function of the adder/subtractor 20. Further, the boundary between the digital and analogue portions of the control unit 13 can be changed by providing an analogue-to-digital converter to which the feedback signal $V_I$ is fed; its comparison with $V_{ON}$ and $V_{OFF}$ can then be achieved entirely digitally, and combined if desired with the generation of $V_{ON}$ and $V_{OFF}$.

Alternatively $V_{ON}$ and $V_{OFF}$ can be generated by two D/A converters 22 and 40 as shown in FIG. 3. In this arrangement the zone width store 21 uses $D_{SIG}$ to decide on the magnitude of two digital output signals to D/A converters 22 and 40 representing $V_{ON}$ and $V_{OFF}$ respectively. The analogue outputs from the two D/A converters are fed to two comparators 23 and 41 respectively both of which are also fed by the signal $V_I$ from the sensor 12 the inputs to the comparators being arranged so that if $V_{ON}$ exceeds $V_I$ comparator 23 gives a positive output signal while comparator 41 gives a positive output if $V_I$ exceeds $V_{OFF}$. The outputs from the two comparators are used to change the state of an R/S type flipflop 42. Once reset by comparator 23 the R/S flipflop holds the switch 11 in the ON condition and ignores subsequent changes in the output from comparator 23 until the current in the inductive load 10 has risen such that the signal $V_I$ from the sensor 12 just exceeds the $V_{OFF}$ signal from D/A 40 causing comparator 41 to give a positive output which sets the R/S flipflop 42 so that the output from 42 turns the switch 11 to OFF. The R/S flipflop holds the switch 11 in the OFF state while current in the inductive load falls and ignores subsequent changes in the output from comparator 41 until comparator 23 give a positive output due to $V_I$ falling below $V_{ON}$. The arrangement in FIG. 3 may optionally include the counter 26 and flipflop 27 used to signal zone width store 21 so that dither can be added to the PWM signal as described for FIG. 1.

Figure 4:
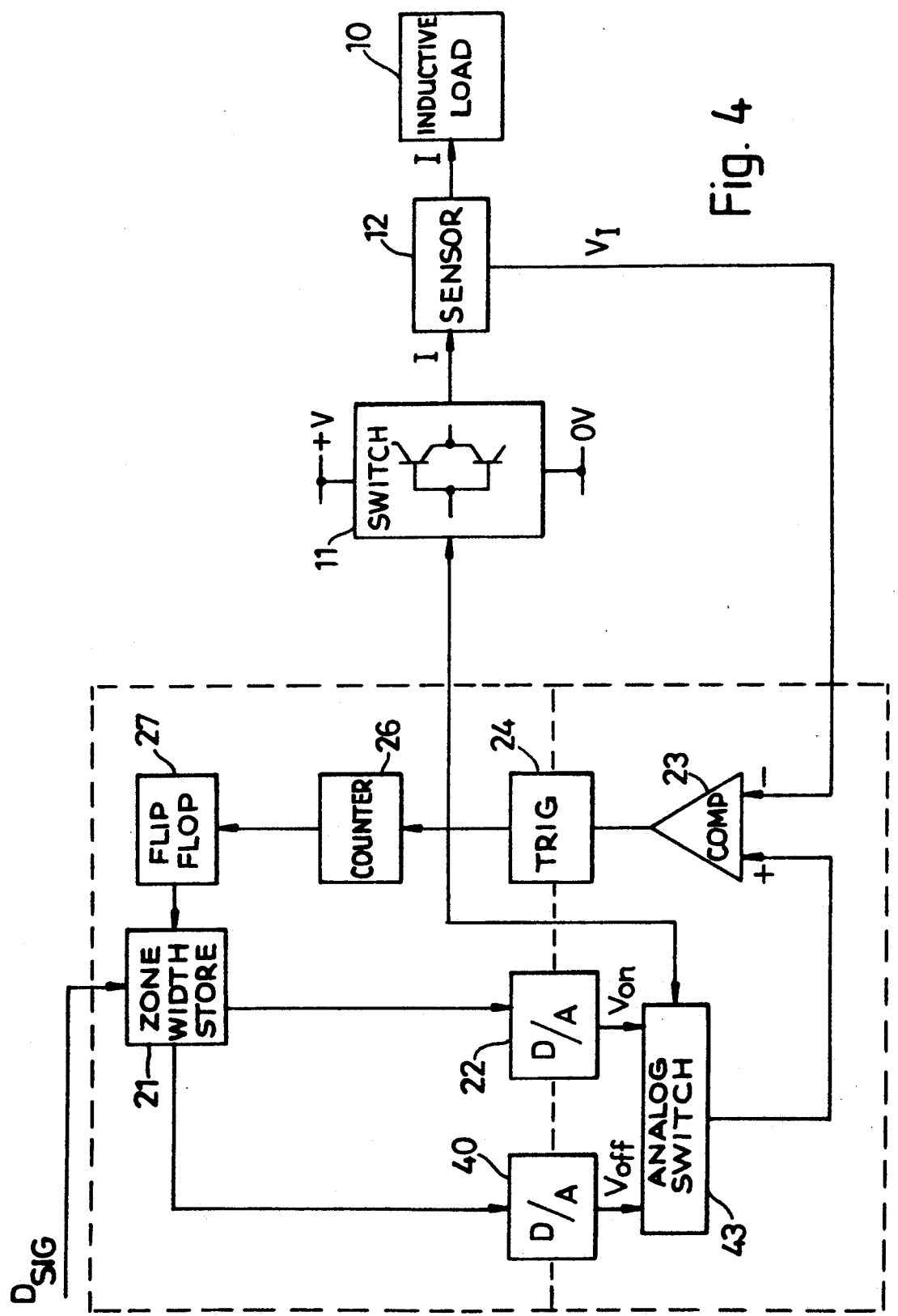

In the alternative arrangement shown in FIG. 4 the switching between $V_{OFF}$ and $V_{ON}$ signals to the comparator 23 is done by an analogue switch 43 rather than digital means used in FIG. 1. The trigger 24 and comparator 23 operate as described for FIG. 1. When the switch 11 is ON the analogue switch 43 is set so that the $V_{OFF}$ signal is sent to the comparator 23. The current in the inductive load is able to rise until the output $V_I$ from the current sensor 12 exceeds $V_{OFF}$ causing the output from the comparator 23 to change the state of the trigger circuit 24 which in turn turns the switch 11 to OFF and switches the analogue switch 43 such that the $V_{ON}$ is connected to the comparator 23. The current in the inductive load is now able to fall until $V_I$ is below $V_{ON}$ so causing the output of the comparator 23 and the output of the trigger circuit 24 to change so turning the switch 11 ON.

It will be appreciated that an analogue input signal could be monitored by an analogue-to-digital converter the output from which is connected to $D_{SIG}$. The accuracy of the current control is limited to the accuracy of the AID converter.

Figure 5:
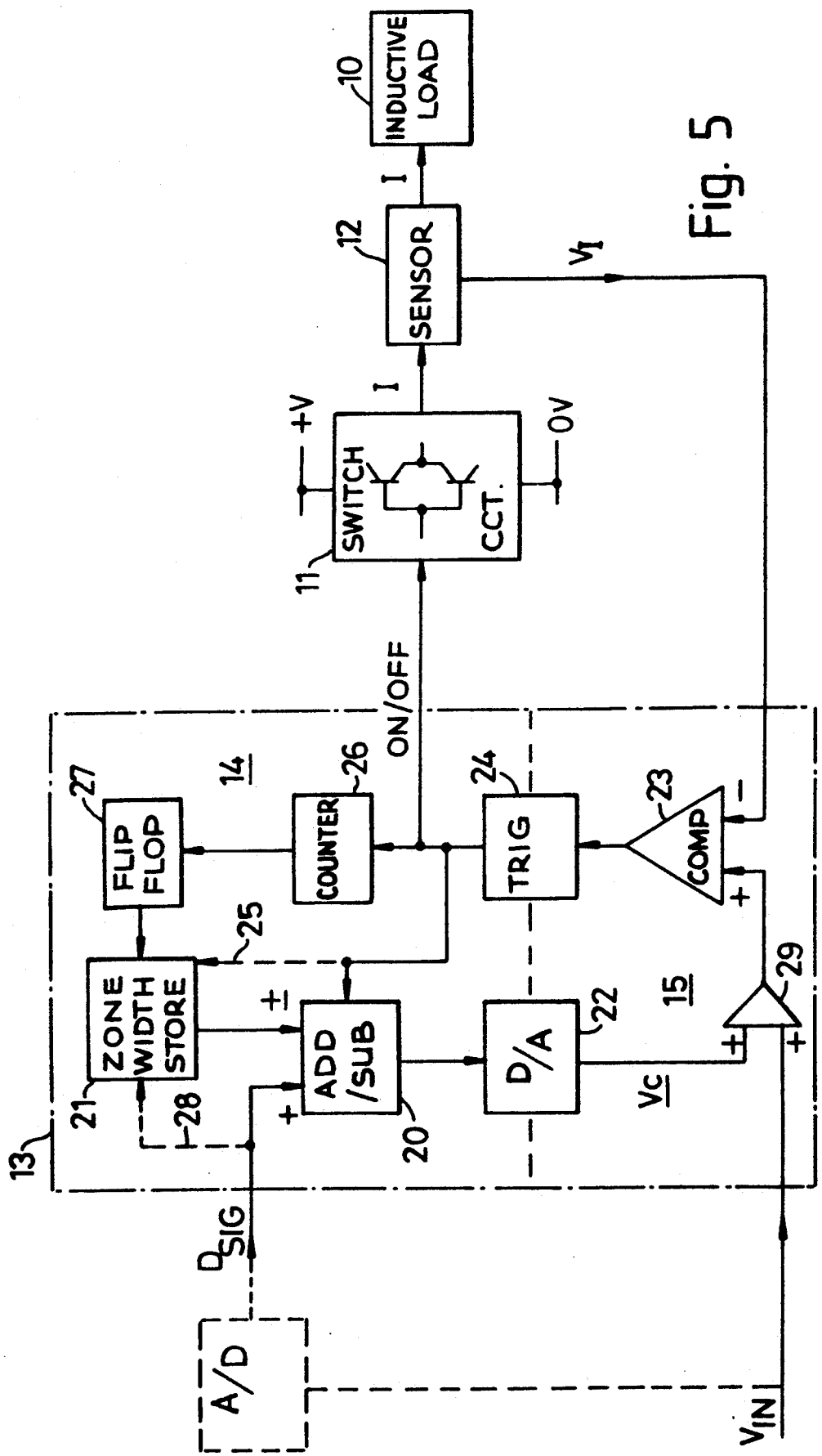

In an alternative embodiment as shown in FIG. 5, which is basically the same as FIG. 1, an analogue input signal $V_{IN}$ is summed in a summing amplifier 29 with the output from the D/A converter 22 prior to the comparator 23. The summing amplifier 29 allows the analogue signal $V_{IN}$ to add to or subtract from the output level of the D/A converter 22. In operation, this analogue input signal can be used for a number of purposes including adjusting the absolute levels of $V_{ON}$ and $V_{OFF}$ such that the current is zero for a zero digital input signal or providing means for modifying the current level in response to any suitable analogue signal. The D/A converter 22 provides the negative and positive offsets as described above to establish the switching zone. Decisions on the zone width values can still be made by the digital part of the modulator based on the observed PWM frequency or by use of an A/D converter measuring the analogue input signal. The accuracy of this A/D converter would not be critical to the overall accuracy and a limited resolution A/D converter could be used.

This arrangement allows the current magnitude to be set by a combination of analogue and digital signals, if desired, in that $V_{IN}$ can provide an offset to the level set by $D_{SIG}$. The critical components can be said to be the sensor 12, the comparator 23 and the summing amplifier 29 and if high quality components are employed for these items, the circuit will provide accurate current control in response to $V_{IN}$.

Another arrangement in which an analogue input signal $V_{IN}$ is monitored by an analogue-to-digital converter, is that in which the output from the D/A converter 22 is connected to the digital portion 14 of the control circuit 13. This analogue-to-digital converter can be a separate device or can be implemented using the arrangement shown in FIG. 6. In this configuration a sample-and-hold device 32 is used to maintain the $V_{ON}$ and $V_{OFF}$ signals to one input of the comparator 23. The analogue input $V_{IN}$ is applied to one input of the comparator 37, the other input being provided by the D/A 22. The output of the comparator 37 is applied to a monitor 38, the output of which is applied to the digital control circuit 14.

When not required to provide new $V_{ON}$ and $V_{OFF}$ signals to the sample-and-hold device, the D/A converter 22 can be used to monitor or measure the analogue input signal by techniques such as successive approximation or a tracking technique. This hardware configuration allows a microprocessor or other digital circuits to calculate new levels of $V_{ON}$ and $V_{OFF}$ in response to the measurements made. The advantage of this configuration is that the digital part 14 of the circuit still maintains control over the current levels in the inductive load, and limits on the rate of change of current and other similar features can be implemented by suitable programming or design cf the digital control circuits. In as much as the D/A converter 22 is being used both to monitor the input signal and control the load current, this enhances the accuracy of the current controller.

One or more sample-and-hold devices 32, 33 can be used to allow more than one inductive load 10, 36 to be controlled. Such an arrangement requires duplication of some of the control functions. The output of each sample-and-hold devices 32, 33 is applied to a comparator 23, 39.

Figure 6:
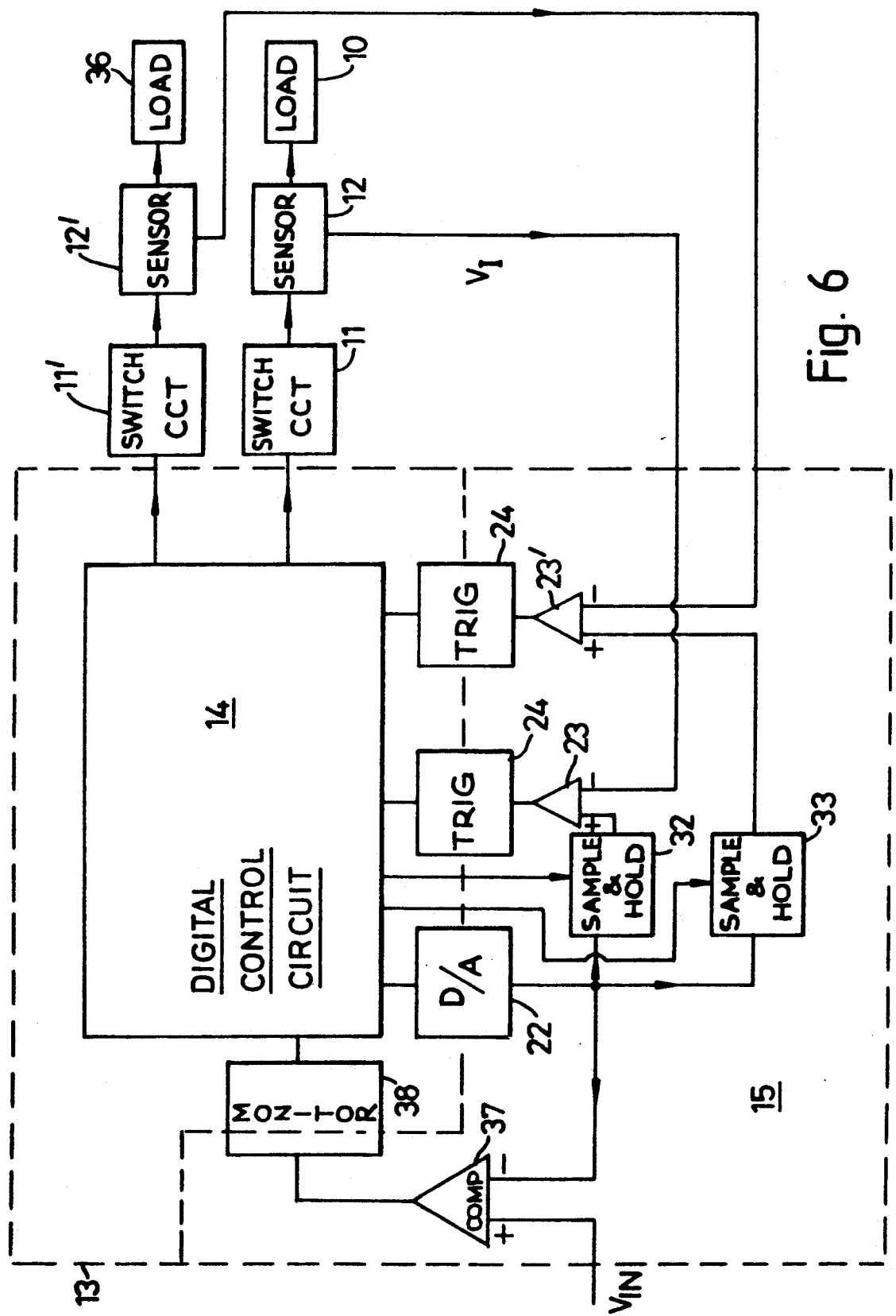

The embodiment of FIG. 6 may be modified by way of having the output of the D/A 22 summed with an analogue input signal $V_{OFFSET}$ as in the FIG. 3 embodiment.

It will be appreciated that the D/A 22 and the comparator 37 could be used to find the input signal by successive approximations. Also the D/A converter 22 can output a voltage midway between $V_{ON}$ and $V_{OFF}$. The output of the comparator 37 can be tested to establish whether the average current is above or below the required current as specified by the input voltage.

If it is required to control the rate of charge of current, a fixed step change in $V_{ON}$ and $V_{OFF}$ can be made at preset time intervals. Before making a step change, the analogue input signal can be compared with the average of $V_{ON}$ and $V_{OFF}$ that will exist after the step.

A number of software schemes can be devised to allow current to ramp up and down in response to the analogue input.

The digital elements of the various embodiments may be implemented using a microprocessor, programmable logic devices, or discrete hardware.

Any of the digital current controllers described can be used to control more than one load using an additional sample-and-hold device, comparator, tripper, sensor and switching circuit as illustrated in FIG. 6.

We claim:

1. Circuitry for digital proportional control of current in an inductive load, comprising control circuitry fed with a control signal switching circuitry for driving the load with a pulse-width-modulated drive voltage to the load, load current sensing means, and a feedback path from the sensing means to the control circuitry, characterized in that the control circuitry comprises means for storing zone width values in digital form, means for converting the zone width values to zone boundary signals one on each side of the control signal, and means for comparing the feedback signal with the zone boundary signals and driving the switching circuitry with the resulting signal.

2. Circuitry according to claim 1, wherein the width of the zone boundary signals is varied in dependence upon a parameter of the circuitry.

3. Circuitry according to claim 2, wherein said parameter is one of the group comprising the magnitude of the control signal, a submultiple of the PWM drive signal to cause dither, and the frequency of the PWM signal.

4. Circuitry according to claim 1, wherein the comparing and driving means comprise digital-to-analogue converter means, analogue comparator means fed by the digital-to-analogue converter means and the feedback path, and a trigger circuit fed by the comparator.

5. Circuitry according to claim 4, wherein two or more digital-to-analogue converters are used to allow control of two or more inductive loads.

6. Circuitry according to claim 4, wherein the converter means comprises two digital-to-analogue converters operable to generate respective zone boundary signals, with the converters feeding respective analogue comparators.

7. Circuitry according to claim 4, wherein the converter means comprise two digital-to-analogue converters operable to generate respective zone boundary signals, and in that analogue switch means is provided to apply one or other of the zone boundary signals to the comparator means.

8. Circuitry according to claims 4, wherein the output of the digital-to-analogue converter means is also applied to a sample-and-hold circuit which also receives an input from the control circuit, the output from the sample-and-hold circuit being applied to the comparator to maintain the zone boundary signal as required.

9. Circuitry according to claim 8, wherein two or more sample-and-hold devices are connected to the output of one D/A converter to allow control of two or more inductive loads.

10. Circuitry according to claim 4, wherein the control circuitry controls a digital-to-analogue converter the output of which is compared by a comparator with an analogue input signal, the output of the comparator being applied to monitor means, the output of which is applied to the control circuit so that the latter can monitor the output from the comparator.

11. Circuitry according to claim 4, wherein the output from the D/A converter is summed with an analogue input signal which is used to modify the magnitude of the current in the load.

12. Circuitry according to claim 11, wherein the analogue input signal is fed to an A/D converter the output of the A/D converter being used to select the magnitude of the zone width signals.

13. Circuitry according to claims 1, wherein the feedback signal is summed with an analogue input which is used to modify the magnitude of the current in the load.

14. Circuitry according to claim 1, wherein the zone boundary signals are generated by combining a half-zone-width signal with the control signal.

15. Circuitry according to claim 1, wherein two slightly different half-zone-width signals are used to define the two zone boundaries relative to the control signal.

16. Circuitry according to claim 1, wherein the switching circuitry is arranged to connect the load to a power supply in a plurality of different ways so as to modify the rate of change of current and/or direction of current, the selection of different power supply connections being made in response to control signals from the control circuitry.

17. Circuitry according to claim 1, wherein the digital elements are implemented by a microprocessor programmable logic devices or discrete hardware.

18. A method of controlling current in an inductive load comprising the steps of applying a control signal to control circuitry driving switching circuitry from the control circuitry to produce a pulse-width-modulated drive voltage for the load, sensing the current through the load, and providing a feedback signal to the control circuitry, characterized in that the method comprises the further steps of storing zone width values in digital form, converting the zone width values to zone boundary signals one on each side of the control signal, and comparing the feedback signal with the zone boundary signals, and driving the switching circuit with the resulting signal.

19. A method according to claim 18, wherein the step of converting the zone width values to zone boundary signals comprises the steps of varying the width of the zone boundary signals in dependence upon a parameter of the circuitry.

20. A method according to claim 19, wherein said parameter is one of the group comprising the magnitude of the control signal, a submultiple of the PWM drive signal to cause dither, and the frequency of the PWM signal.

21. A method according to claim 18, wherein the comparing and driving step comprises converting the zone boundary signals from digital form to analogue form, comparing the analogue form with the feedback signal, and outputting the comparator to a trigger circuit.

22. A method according to claim 21, wherein it comprises the further step of sampling and holding the analogue form of the zone boundary signals.

23. A method according to claim 21 or 22, wherein the converted boundary zone signals are summed with an analogue input signal which is used to modify the magnitude of the current in the load.

24. A method according to claim 23, wherein the analogue input signal is converted to digital form and used to select the magnitude of the zone width signals.

25. A method according to claim 18, wherein the feedback signal is summed with an analogue input which is used to modify the magnitude of the current in the load.

26. A method according to claim 18, wherein two or more inductive loads are controlled.

* * * * *